(12) United States Patent
Grandi et al.

(10) Patent No.: US 9,461,906 B2
(45) Date of Patent: Oct. 4, 2016

(54) METHOD FOR EXCHANGING INFORMATION FOR ESTABLISHING A PATH BETWEEN TWO NODES OF A COMMUNICATION NETWORK

(71) Applicant: Alcatel Lucent, Boulogne Billancourt (FR)

(72) Inventors: Pietro Vittorio Grandi, Milan (IT); Italo Busi, Milan (IT); Sergio Belotti, Milan (IT)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/431,181

(22) PCT Filed: Oct. 8, 2013

(86) PCT No.: PCT/EP2013/070871
§ 371 (c)(1),
(2) Date: Mar. 25, 2015

(87) PCT Pub. No.: WO2014/056863
PCT Pub. Date: Apr. 17, 2014

(65) Prior Publication Data
US 2015/0244605 A1 Aug. 27, 2015

(30) Foreign Application Priority Data
Oct. 12, 2012 (EP) .................................... 12306254

(51) Int. Cl.
*H04L 12/26* (2006.01)
*H04L 12/751* (2013.01)
*H04L 12/913* (2013.01)

(52) U.S. Cl.
CPC ............ *H04L 43/10* (2013.01); *H04L 45/026* (2013.01); *H04L 47/724* (2013.01)

(58) Field of Classification Search
CPC .... H04L 45/026; H04L 47/724; H04L 43/10
See application file for complete search history.

(56) References Cited

U.S. PATENT DOCUMENTS

| 8,918,538 | B2 * | 12/2014 | Mohan | .......................... 709/242 |
| 2009/0232006 | A1 * | 9/2009 | Mohan | .................... H04L 43/10 370/241.1 |
| 2012/0014261 | A1 * | 1/2012 | Salam | ................. H04L 43/0811 370/242 |

FOREIGN PATENT DOCUMENTS

WO    2009049292    4/2009

OTHER PUBLICATIONS

Takacs, A. et al; GMPLS RSVP-TE Extension for OAM Configuration draft-ietf-ccamp-oam-configuration-fwk-07.txt; Internet Engineering Task Force, IETF; Standardworkingdraft, Internet Society (ISOC) 4, rue Des Falaises CH-1205 Geneva, Switzerland; Jan. 11, 2012; pp. 1-24; XP015080130.
Allan, D. et al; Proactive Connectivity Verification, Continuity Check, and Remote Defect Indication for the MPLS Transport Profile; rfc6428.txt; RFC6428.TXT; Internet Engineering Task Force, IETF; Standard, Internet Society (ISOC); 4, rue Des Falaises CH-1205 Geneva, Switzerland; Nov. 17, 2011; pp. 1-21; XP015081355.
Katz, D. et al; Traffic Engineering (TE) Extensions to OSPF Version 2; RFC3630.txt; Sep. 1, 2003; XP015009412; ISSN: 0000-0003; Standards Track.

* cited by examiner

*Primary Examiner* — Jianye Wu
(74) *Attorney, Agent, or Firm* — Patti & Malvone Law Group, LLC (57) ABSTRACT

An exemplary method and apparatus are provided for exchanging information for establishing a path between a first node and a second node of a communication network. The first node and the second node are adapted to send continuity check messages to monitor the established path. The technique includes generating, at the first node and at the second node, at least one link state message according to a routing protocol; inserting continuity check link state information into the at least one link state message; and exchanging between the first node and the second node, the link state messages for computing the path. The continuity check link state information are indicative of at least one rate of transmission of the continuity check messages supported by the first node and the second node.

14 Claims, 6 Drawing Sheets

METHOD FOR EXCHANGING INFORMATION FOR ESTABLISHING A PATH BETWEEN TWO NODES OF A COMMUNICATION NETWORK

TECHNICAL FIELD

The present invention generally relates to the field of communication networks. More in particular, the present invention relates to a method for exchanging information for establishing a path between two nodes of a communication network (in particular, but not exclusively, an MPLS network or an MPLS-TP network or a GMPLS network).

BACKGROUND ART

As known, current communication networks, such as IP (internet Protocol) networks, make use of the Multi-Protocol Label Switching (MPLS) for carrying data traffic flows between the nodes of the network. Data traffic flows are made of packets that are generated at a source node. According to the MPLS, each packet is associated to a "label". The packets are then routed towards a destination node on the basis of their labels.

In particular, the path followed by a packet from a source node to a destination node within a MPLS network is called a Label Switched Path (LSP). It is determined by the MPLS control plane of the network before transmitting the packets and typically comprises one or more intermediate nodes between the source node and the destination node. At each intermediate node, the packet is switched to the next intermediate node of the determined path according to the value of the label it carries. Prior to sending the packet, the intermediate node replaces the label with a new value that shall be read by the next intermediate node for performing its own switching operation (this operation is known as "label swapping").

The MPLS control plane has been extended in order to be used to create label switched path also over non IP networks, such as SDH (Synchronous Digital Hierarchy) or WDM (Wavelength Division Multiplexing) networks. In this form, MPLS control plane is known as Generalized MPLS or GMPLS control plane.

A profile of the MPLS data plane, termed MPLS-TP (MPLS Transport Profile), has also been defined for deploying MPLS packet switching within transport networks.

Traffic engineering (TE) is a method which is typically used in packet networks for improving the routing of the packets and the usage of network resources (e.g. links, devices, interfaces, etc.). It consists in providing additional information to the nodes related to resource usage and resource availability. Moreover, it allows the routing operation to take into account the Quality of Service (QoS) requirements of the data traffic flows transported by the network. For instance, traffic engineering provides information about underused and overused resources and the available bandwidth along the network links. Traffic engineering allows data packets to be routed so that usage of resources is balanced and congestions are avoided, while guaranteeing that the QoS is maintained. MPLS technology has been extended to incorporate TE functionalities and networks implementing such extended version of MPLS are usually referred to as "MPLS-TE networks".

In the following, the expression "MPLS based network" or simply "MPLS network" will be used to refer indifferently to an MPLS, MPLS-TP or GMPLS network, and also to refer to any one of these networks implementing TE functions.

As known, the set up of an LSP requires coordinated implementation of a routing protocol and a signalling protocol.

The routing protocol supports the advertisement of network topology information and available resource information between the nodes of the network. Known MPLS routing protocols include link state routing protocols, such as the Open Shortest Path First (OSPF) protocol, and in particular the Open Shortest Path First protocol with extensions to support traffic engineering functions (OSPF-TE). The OSPF-TE protocol is defined in the Requests for Comments RFC3630 (September 2003), RFC4202 (October 2005) and RFC4203 (October 2005). In particular, each node maintains a link state database with the current network topology and changes occurring in network topology are distributed through flooding. According to the OSPF-TE protocol, advertisements are flooded among the nodes of the network so as to distribute information on the network topology and also on the properties of the traffic engineering (TE) links comprised within the network. According to RFC4202, a TE link is a "logical" link that has TE properties. The link is logical in a sense that it represents a way to group/map the information about certain physical resources (and their properties) that interconnect the nodes of the network into the information that is used by the MPLS routing protocol, for the purpose of path computation, and by the MPLS signalling protocol. In particular, a TE link may result from the "logical" grouping of one or more physical links between two or more nodes of the network.

The OSPF-TE protocol provides for advertising the properties of a link or a TE link such as the available bandwidth, the switching capabilities, the type of the link and so on in a dedicated link state advertisement (LSA). Moreover, the OSPF-TE protocol provides for collecting the information on TE links into a TE link state database. The LSA related to a link or TE link is originated by an end node of the link and comprises a payload in turn comprising a link TLV (i.e. a triplet Type/Length/Value) describing the link. The link TLV in turn comprises a set of sub-TLVs containing, for instance, the link type (i.e. point-to-point link or multi-access link), the link ID (i.e. the identifier of the other end node of the link) and the IP addresses of the local interfaces. Moreover, the link TLV may comprise a further sub-TLV, the Interface Switching Capability Descriptor (ISCD) TLV, which describes the switching capabilities (e.g. the capability of switching packets on a packet-by-packet basis according to the carried label) of the interface(s) through which the link is connected to the node generating the LSA.

The signalling protocol supports tasks such as exchanging control information among nodes, distributing labels, and reserving resources along the path. Known signalling protocols for the MPLS control plane include the Resource Reservation Protocol (RSVP), and, in particular the Resource Reservation Protocol with extensions to support traffic engineering functions (RSVP-TE). The RSVP protocol is defined in the IETF's Requests for Comments RFC2205 (September 1997) and RFC2210 (September 1997). According to such protocol, the source node generating a data traffic flow sends a path message that is transmitted to the first intermediate node and then forwarded to the other intermediate nodes along the label switched path whose route is selected based on the information distributed by the routing protocol. As known (see document RFC2210, section 3.1), the path message contains some data objects comprising, inter alia, a sender_template object comprising the IP address of the source node, a sender_tspec object comprising the traffic attributes of the source node's data traffic flow and further comprising the bandwidth of the label switched path, and an adspec object containing advertising data. The destination node, at the reception of the path message, sends a reservation message to the source node along the reverse path, which triggers each intermediate node to reserve the resources needed to set up the label switched path.

As known, in a MPLS network, OAM (Operation, Administration and Management) functions are defined which allows, inter alia, monitoring the presence of failures along a label switched path at an end node of the path. In particular, this monitoring function may be performed via the periodic transmission of a continuity check (CC) packet towards the opposite end node of the path (see document RFC6371, September 2011). If the CC packet is not received within a certain number of consecutive transmission periods (typically three) the monitored LSP is declared in failure.

A known OAM protocol configured to detect the presence of failures along a label switched path is the Bidirectional Forwarding Detection (BFD) protocol. The BFD protocol has been extended in order to support the emission of CC packets and this extension is defined in IETF's Request for Comments RFC 6428 (November 2011). According to this exemplary OAM protocol, the end nodes of the path start a monitoring session by negotiating the rate of transmission of the CC packets, according to their respective available rate of transmission, and then the CC packets are sent at the negotiated rate of transmission so that a failure may be detected after three transmission periods.

Once a failure is detected on a label switched path, it is further known to implement a protection mechanism (i.e. re-routing the traffic on a pre-established alternative protection path), a restoration mechanism (i.e. re-routing the traffic on a new path dynamically calculated as soon as the failure is detected) or a protection and restoration combined (PRC) mechanism for recovering from the failure. In particular, the PRC mechanisms allows recovering from dual failures, i.e. failures on both the working and protection paths by dynamically calculating another protection path. Typically, the time for switching from the working path to the protection path, and, in case of a further failure on the protection path, from the failed protection path to the protection path which is dynamically established, shall be lower than a threshold which depends on the required performances and on the service level associated to the traffic to be protected. The switching time required to comply with the service level agreements may be some tens of milliseconds, e.g. less than 50 ms.

SUMMARY OF THE INVENTION

As detailed in IETF's Request for Comments RFC5654 (September 2009), MPLS-TP must provide mechanisms to guarantee 50 ms recovery times from the moment of a failure detection. In order to be able to switch from the working path to a protection path in less than 50 ms, the failure shall be detected in a short period. A typical value for such a short period (which will be indicated as failure detection period) is 12 ms, as provided in document RFC6371, section 5.1.3. In order to detect a failure within 12 ms, the CC packet transmission period must be 3.33 ms (or, equivalently, the CC packet transmission rate must be equal to 300 packets/second) since, as mentioned above, typically failure declaration occurs if a CC packet is not received within three consecutive transmission periods.

The inventors noticed that when a path is established, and in particular a label switched path, the end nodes of the path may not support the rate of transmission of the CC packets required for short failure detection periods and short recovery times. Moreover, according to the implementation of the OAM monitoring function at the interface (hardware or software implementation), different interfaces comprised within the same network node may support different rates of transmission of the CC packets. Typically if the monitoring function has a hardware implementation, the interface shall be able to support the required CC packet transmission rate, while if the monitoring function has a software implementation the interface may not be able to support the required CC packet transmission rate. If the "wrong" interface is selected at the moment of path set up (namely, an interface which does not support the required CC packet transmission rate), the path must be tore down and recalculated.

In particular, as described above, after a path is determined (through implementation of the routing protocol) and set up (through implementation of the signalling protocol), an OAM protocol, e.g. the BFD protocol, may be implemented for monitoring the liveness of the path between the end nodes. The monitoring session is set up after negotiation of the rate of transmission of CC packets between the end nodes of the path. For instance, if one node declares to support a CC packet transmission rate of 300 packets/second and the other node declares that it supports a CC packet transmission rate of 100 packets/second, then the BFD protocol provides for transmitting the CC packets along the path at a rate equal to 100 packets/second and that, accordingly, a failure may be detected after at least 30 ms. In this case, if a PRC mechanism is implemented for protecting the path after detection of a failure, a switching time less than 50 ms may not be guaranteed. Therefore, the path shall be tore down and an alternative path shall be computed. However, disadvantageously, this computation does not guarantee that the alternative path supports the required CC packets transmission rate.

Moreover, when an end node computes a label switched path, it typically determines only the intermediate nodes to be traversed but not the interfaces to be used at the nodes. As discussed above, at a same node, different interfaces may have different capabilities (and hence they may support different CC packet transmission rates). In case of a unidirectional label switched path, the choice of the interface terminating the path is performed by the end node. According to the RSVP-TE signalling protocol mentioned above, the penultimate node sends a path message to the end node and the end node reserves the interface through which it wants to receive the data traffic flow. If a CC packet transmission rate of 300 packets/second is required, the end node chooses the interface which is able to support such rate. In case of bidirectional label switched paths, the choice of the interface terminating the path may be performed also by the penultimate node. In this case, the penultimate node may select an interface of the end node which is not able to support the required CC packet transmission rate. Hence, the path shall be tore down and another one shall be set up forcing the penultimate node to choose the interface of the end node which is able to support the required CC packet transmission rate.

In view of the above, the set up of a path (a working path or a protection path) between two nodes in the network is disadvantageously tentative since the path may be tore down when implementation of the OAM monitoring function reveals that the path does not support the required CC packet transmission rate. This may cause unacceptable delays in delivering the traffic flows, especially when high service levels are to be granted.

Accordingly, the inventors have addressed the problem of providing a method for exchanging information for establishing a path (in particular, but not exclusively, a label switched path) between two nodes of a communication network (in particular, but not exclusively, an MPLS, MPLS-TP or GMPLS network) which allows to overcome the aforesaid drawbacks. In particular, the inventors have addressed the problem of providing a method for exchanging information for establishing a path between two nodes of a communication network which allows determining the path in a non tentative way which ensures the possibility of monitoring the path at a required CC packet transmission rate.

According to a first aspect, the present invention provides a method for exchanging information for establishing a path between a first node and a second node of a communication network, the first node and the second node being operable to send continuity check messages for monitoring the established path, wherein the method comprises:
a) generating, at the first node and at the second node, at least one link state message according to a routing protocol;
b) inserting continuity check link state information into the at least one link state message; and
c) exchanging, between the first node and the second node, the link state messages for computing the path;
wherein the continuity check link state information are indicative of at least one rate of transmission of the continuity check messages supported by the first node and the second node.

This way, upon establishment of the path, the first node and the second node are able to send the continuity check messages at the at least one rate of transmission.

Preferably, step b) comprises, at each of the first node and the second node, inserting into the at least one link state message one or more rates of transmission of said continuity check messages supported by respective one or more physical resources interconnecting the node to its neighbouring nodes of the communication network, and, for each of the supported one or more rates of transmission, a respective maximum bandwidth of the path that can be monitored with the continuity check messages emitted at each of the supported rates.

Alternatively, step b) comprises, at each of the first node and the second node, inserting into the at lest one link state message one or more respective ranges of rates of transmission of the continuity check messages supported by respective one or more physical resources interconnecting the node to its neighbouring nodes of the communication network, and, for each of the one or more supported ranges, a respective maximum bandwidth of the path that can be monitored with the continuity check messages emitted at a rate within each of said supported ranges.

Preferably, the method further comprises:
d) generating, at the first node, at least one signalling message according to a signalling protocol;
e) inserting continuity check signalling information into the at least one signalling message; and
f) sending from the first node to the second node the at least one signalling message for establishing the path;
wherein the continuity check signalling information are indicative of at least one requested rate of transmission of the continuity check messages.

Preferably, step e) comprises inserting into the at least one signalling message one requested rate of transmission of the continuity check messages.

Alternatively, step e) comprises inserting into the at least one signalling message a requested range of rates of transmission of the continuity check messages.

Preferably, the path is a label switched path.

Preferably, the routing protocol is the OSFP-TE routing protocol and the at least one link state message is a link state advertisement comprising a header and a payload.

Preferably, step b) comprises inserting the continuity check link state information within a dedicated sub-TLV into a traffic engineering TLV comprised within the payload.

Alternatively, step b) comprises inserting the continuity check link state information into a switching capability-specific information field of an interface switching capability descriptor sub-TLV of a traffic engineering TLV comprised within the payload.

Preferably, the signalling protocol is the RSVP-TE signalling protocol.

Preferably, the signalling message is a path message and step e) comprises inserting the continuity check signalling information into a dedicated object of the path message.

According to a second aspect, the present invention provides a node for a communication network, the communication network comprising a further node, the node comprising a control plane module, the control plane module comprising a routing controller configured to:
  generate at least one link state message according to a routing protocol;
  insert continuity check link state information into the at least one link state message; and
  send the at least one link state message to the further node, for computing a path connecting the node and the further node,
wherein the continuity check link state information are indicative of at least one rate of transmission of the continuity check messages supported by the node and the further node.

Preferably, the node further comprises a signalling controller configured to:
  generate at least one signalling message according to a signalling protocol;
  insert continuity check signalling information into the at least one signalling message; and
  send the at least one signalling message to the further node for establishing the path,
wherein said continuity check signalling information are indicative of at least one requested rate of transmission of the continuity check messages.

According to a third aspect, the present invention provides a communication network comprising a node as set forth above.

Preferably, the communication network is an MPLS, MPLS-TP or GMPLS network supporting traffic engineering functions.

According to a fourth aspect, the present invention provides a computer program product comprising computer-executable instructions for performing, when the program is run on a computer, the steps of the method as set forth above.

BRIEF DESCRIPTION OF THE DRAWINGS

Embodiments of the invention will be better understood by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
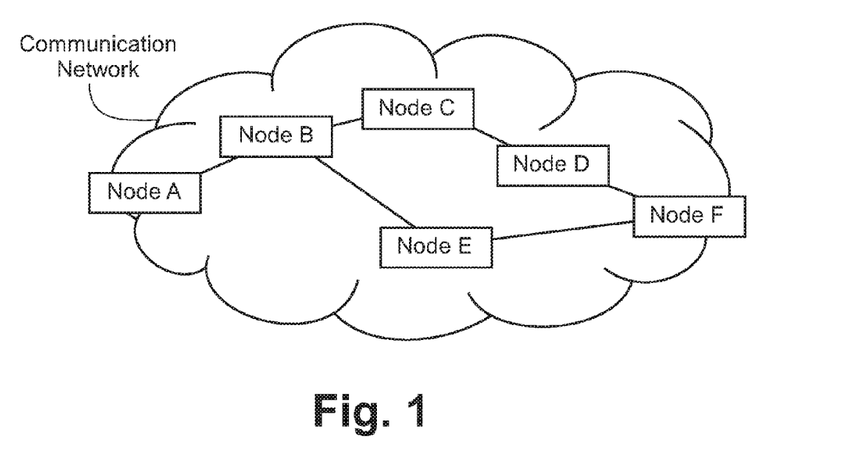
FIG. 1 shows an exemplary communication network.

FIG. 1 shows a communication network CN according to an embodiment of the present invention. The communication network CN is preferably a packet-switched network. More preferably, the communication network CN is a Multi-Protocol Label Switched (MPLS) network or a Multi-Protocol Label Switched-Transport profile (MPLS-TP) network, or a Generalized Multi-Protocol Label Switched (GMPLS). The communication network CN preferably supports traffic engineering (TE) functions.

The communication network CN comprises a number of nodes. The communication network CN of FIG. 1 comprises, by way of non limiting example, six nodes A, B, C, D, E and F. The nodes A, B, C, D, E, F of the communication network CN are connected by means of links. The links connecting the nodes A, B, C, D, E, F in FIG. 1 may be physical links (e.g. optical fibers) and/or logical links such as TE links. A logical, or TE, link between two nodes of the communication network CN may comprise a bundle of two or more physical links.

Each node A, B, C, D, E, F of the communication network CN comprises one or more interfaces, according to the number of physical links that enter/exit the node, a data plane module and a control plane module. The data plane module of the node is a switching device.

The nodes of the communication network CN may comprise other modules and devices that will not be described herein after as they are not relevant to the present description.

Figure 2:
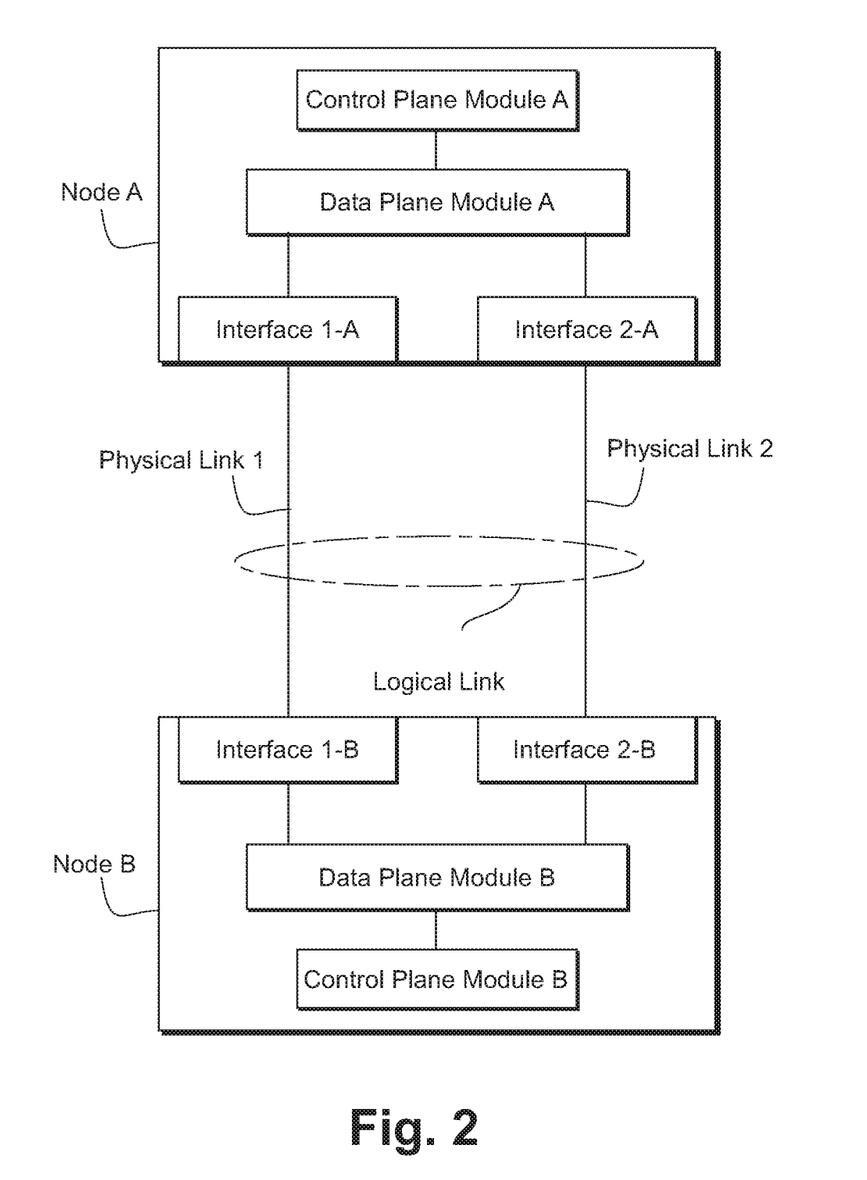
FIG. 2 shows two nodes of the communication network of FIG. 1 and the links connecting them.

FIG. 2 shows node A and node B of the communication network CN. It is assumed, by way of non limiting example, that nodes A and B are connected by means of a first physical link PL1 and a second physical link PL2, which may be bundled into a logical link LL. Then, node A comprises a first interface I1-A for interfacing the first physical link PL1 and a second interface I2-A for interfacing the second physical link PL2. The first and second interfaces I1-A and I2-A may have different capabilities, i.e. they may transmit/receive continuity check (CC) packets at different rates, as it will be described in greater detail herein after. Node A further comprises a data plane module S-A which is connected to the first interface I1-A and to the second interface I2-A, and a control plane module CM-A which is connected to the data plane module S-A.

Similarly, node B comprises a first interface I1-B for interfacing the first physical link PL1 and a second interface I2-B for interfacing the second physical link PL2. The first and second interfaces I1-B and I2-B may have different capabilities. In particular, the first interface I1-B of node B has the same capability of the first interface I1-A of node A and the second interface I2-B of node B has the same capability of the second interface I2-A of node A. Node B further comprises a data plane module S-B which is connected to the first interface I1-B and to the second interface I2-B, and a control plane module CM-B which is connected to the data plane module S-B.

The structure of the other nodes C, D, E, F of the communication network CN is similar to the above described structure of node A and node B. Each node has a number of interfaces equal to the number of physical links that enter/exit the node from/towards the neighbouring nodes.

The data plane module S-A, S-B of a node A, B, C, D, E, F is configured to perform switching operations on data packets transmitted/forwarded from the node to its neighbouring nodes, and on data packets received by the node from the neighbouring nodes (in the scenario of FIGS. 1 and 2, the data plane module S-A of node A is configured to perform switching operations on packets transmitted/forwarded from node A to node B and on packets received by node A from node B).

The control plane module CM-A, CM-B of a node A, B, C, D, E, F is configured to perform signalling, routing, path computing and control functions, as will be described in greater detail herein after.

The control plane module CM-A, CM-B is preferably implemented in software.

Figure 3:
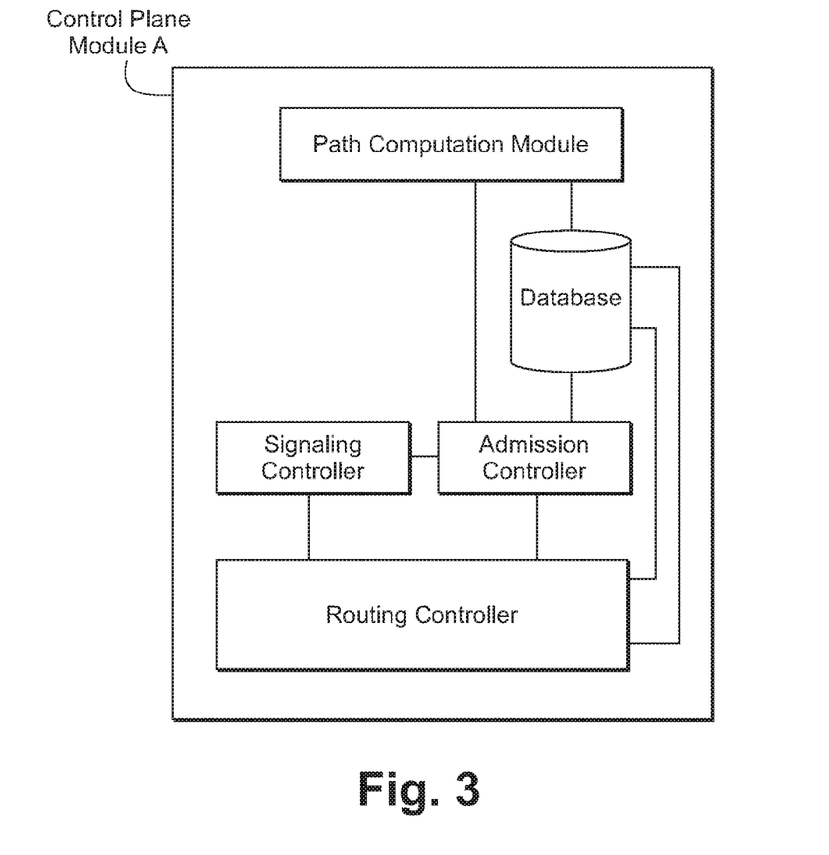
FIG. 3 shows a control plane module at a node of the communication network of FIG. 1 according to an embodiment of the present invention.

FIG. 3 shows the block diagram of the control plane module CM-A of node A. The control plane modules of the other nodes have the same structure. The control plane module CM-A preferably comprises a routing controller RC, a signalling controller SC, an admission controller AC, a database DB and a path computation module PCM. The routing controller RC is connected to the signalling controller SC and the admission controller AC, and it is further connected to the database DB. The signalling controller SC is connected also to the admission controller AC. The path computation module PCM is connected to the admission controller AC and to the database DB.

The signalling controller SC is preferably configured to implement a signalling protocol. Preferably, the signalling protocol is a signalling protocol with extensions to implement traffic engineering functions. More preferably, the signalling protocol is the RSVP-TE signalling protocol.

The routing controller RC is preferably configured to implement a link state routing protocol. Preferably, the link state protocol is a link state routing protocol with extensions to implement traffic engineering functions. More preferably, the link state routing protocol is the OSFP-TE routing protocol. Alternatively, the link state routing protocol may be the IS-IS routing protocol.

The admission controller AC is preferably configured to control the availability of physical and logical resources (including administrative policies) within the network when a path between two nodes is to be setup.

The database DB preferably comprises at least one of a link state database (LSDB) and a TE link state database.

The path computation module PCM is preferably configured to compute a path between two nodes of the communication network CN by using the data contained in the database DB. Preferably, the path is a label switched path (LSP).

During operation of the communication network CN, the routing controller RC of each node periodically triggers the generation of link state messages comprising link state information indicative of the links connected to the node. The link state messages are preferably link state advertisements (LSAs). In particular, according to the OSPF-TE routing protocol (see documents RFC3630 and RFC4203), the LSA related to a link, may comprise a payload in turn comprising a link TLV (i.e. a triplet Type/Length/Value) describing the link. The link TLV in turn comprises a set of sub-TLVs containing, for instance, the link type (point-to-point or multi-access), the link ID (the identifier of the other end node of the link, i.e. the neighbour), the IP address(es) of the interface(s) corresponding to the link, the IP address(es) of the neighbour's interface(s) corresponding to the link, a maximum bandwidth that can be used on the link, an unreserved bandwidth and a link metric i.e. a link cost, which is typically assigned to the link by a network administrator. The unreserved bandwidth corresponds to the bandwidth which is not currently allocated on the link. The link metric may be based on the length of the link. Moreover, the link TLV comprises a further sub-TLV, the Interface Switching Capability Descriptor (ISCD) TLV, which describes the switching capabilities (e.g. the capability of switching packets on a packet-by-packet basis according to the carried label) of the interface(s) corresponding to the link.

The link state messages comprising the link state information related to the links of the node are sent by the node to its neighbours, and then flooded throughout the entire communication network CN.

At each node, the link state messages received from all the other network nodes are collected by the respective routing controller RC and stored into the database DB. In particular, the link state messages related to TE links are stored in the TE link database.

Further, the nodes of the communication network CN originate link state messages whenever a modification occur in the attributes of the links. For instance, the routing controller RC of a node may generate a link state message when a new link is established or when the available bandwidth of an existing link increases/decreases due to the release/allocation of bandwidth resources when a path traversing the link is tore down or set up, respectively.

According to an embodiment of the present invention, when the routing controller RC generates the link state messages comprising the link state information related to the links, it preferably adds to the link state information described above further link state information indicative of one or more rates of transmission of continuity check (CC) packets supported by the interface(s) corresponding to the links, for monitoring path possibly traversing the node. In the following these further link state information will be indicated as "continuity check link state information". Equivalently, the further link state information may be indicative of one or more periods of transmission of continuity check (CC) packets supported by the interface(s) corresponding to the links.

This continuity check link state information may have two different formats:
  they may comprise a list of CC packet transmission periods (e.g. in milliseconds) or rates (in packets/second) supported by the physical resources, i.e. the interface(s) of the node; interconnecting the node to its neighbouring nodes; these periods or rates are in the form of discrete values which are selected from a set of discrete values such as those defined in document RFC6371, section 5.1.3, namely 1 s (which corresponds to a CC packet transmission rate of 1 packet/second), 100 ms (10 packets/second), 3.33 ms (300 packets/second), 10 ms (100 packets/second); for each supported period or rate, the further information also comprises a maximum bandwidth of the path that can be monitored with CC packets emitted at the supported CC packet transmission period or rate; or
  they may comprise a range of CC packet transmission periods (e.g. in milliseconds) or rates (in packets/second) supported by the physical resources, i.e. the interface(s) of the node, interconnecting the node to its neighbouring nodes; in particular, the further link state information related to each interface comprises a minimum period or rate and a maximum period or rate defining the range, and it also comprises a maximum bandwidth of the path that can be monitored with CC packets emitted at a period or rate within the supported range.

The continuity check link state information indicative of the CC packet transmission period(s) or rate(s) and the corresponding maximum path bandwidth are preferably inserted into the link state messages sent by the node according to the link state routing protocol. Preferably, when the OSPF-TE routing protocol is implemented, the continuity check link state information are be inserted in a dedicated sub-TLV into the link TLV comprised within the payload of the LSA.

Figure 4A:
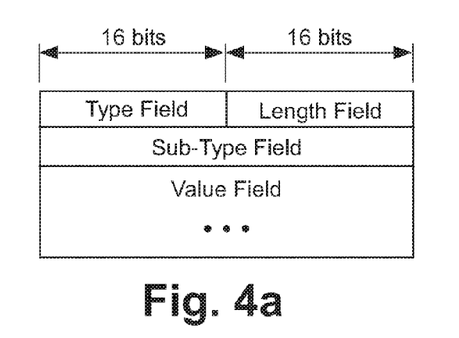
FIGS. 4a, 4b and 4c show the structure of a sub-TLV for the OSPF-TE link TLV according to an embodiment of the present invention.
Figure 4B:
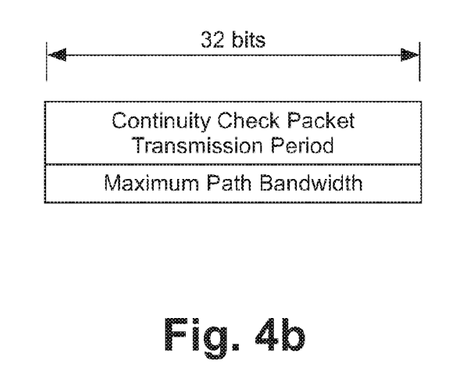
Figure 4C:
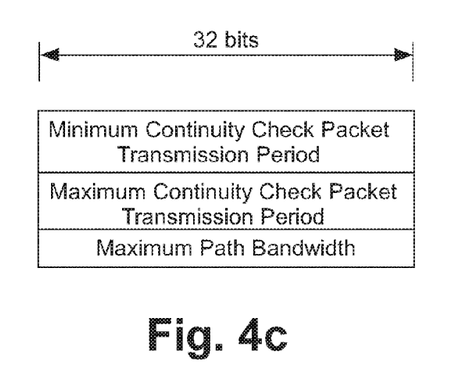

FIGS. 4a, 4b and 4b show the structure of this dedicated sub-TLV. As shown in FIG. 4a, the dedicated sub-TLV preferably comprises a type field T of two bytes, a length field L of two bytes, a sub-type field ST of 4 bytes and a value field V. The type field value T preferably defines the type of the sub TLV. The type field T has a predefined value uniquely identifying the sub-TLV. The length field L preferably comprises the length (in bytes) of the value field V. The sub-type field ST preferably defines the format of the continuity check link state information. The value comprised in this field may be, for instance, equal to 0 if the continuity check link state information comprise discrete values of the supported CC packet transmission periods or rates and it may be equal to 1 if the continuity check link state information comprise ranges of the supported CC packet transmission periods or rates. The value field V preferably comprises the continuity check link state information. In particular, it preferably comprises a set of first data structures or a set of second data structures as those illustrated in FIGS. 4b and 4c, respectively. FIG. 4b shows the first data structure, which is inserted into the value field V when the continuity check link state information comprise discrete values of the supported CC packet transmission periods or rates. The first data structure preferably comprises a first field CCi of 4 bytes comprising the value of the CC packet transmission period or rate and a second field MaxPB of 4 bytes comprising the value of the corresponding maximum path bandwidth. The field value V comprises a set of first data structure whose number is equal to the number of different CC packet transmission periods or rates supported by the interfaces terminating the physical links, which may be advertised as a single logical link. FIG. 4c shows the second data structure, which is inserted into the value field V when the continuity check link state information comprise ranges of the supported CC packet transmission periods or rates. The second data structure preferably comprises a first field MinCCi of 4 bytes comprising the minimum value of the CC packet transmission period or rate, a second field MaxCCi of 4 bytes comprising the maximum value of the CC packet transmission period or rate, and a third field MaxPB of 4 bytes comprising the value of the corresponding maximum path bandwidth. The field value V comprises a set of second data structure whose number is equal to the number of different ranges of CC packet transmission periods or rates supported by the interfaces terminating the physical links, which may be advertised as a single logical link.

Alternatively, the further information may be inserted into the switching capability-specific information field of the Interface Switching Capability Descriptor (ISCD) sub-TLV of the link TLV within the LSA (see RFC4203 section 1.4 for a description of the ISCD).

Figure 5:
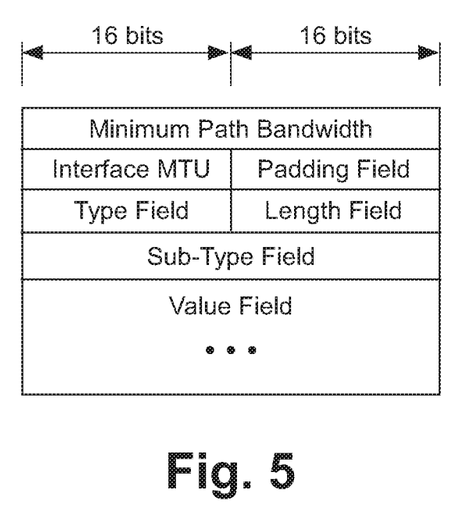
FIG. 5 shows the structure of the switching capability-specific information field of the ISCD sub-TLV of the link TLV according to another embodiment of the present invention.

FIG. 5 shows the structure of the ISCD switching capability-specific information field according to this embodiment of the present invention. The switching capability-specific information field comprises some predefined fields as described in section 1.4 of document RFC4203. In particular these fields comprise the minimum path bandwidth (field MinPB of 4 bytes in FIG. 5), the interface MTU (field IMTU of 2 bytes in FIG. 5) and a padding (field Pad of 2 bytes in FIG. 5). These fields will not be further described since they are not relevant to the present invention. Moreover, according to this embodiment of the invention, the ISCD switching capability-specific information field comprises a dedicated sub-TLV. As shown in FIG. 5, the dedicated sub-TLV preferably comprises a type field T of two bytes, a length field L of two bytes, a sub-type field ST of 4 bytes and a value field V. The-type field value T preferably defines the type of the sub TLV. The type field T, the length field L, the sub-type field ST and the value field V are preferably the same as those illustrated in FIGS. 4a, 4b and 4c, and therefore a description thereof will not be repeated.

The description above related to the OSPF-TE routing protocol is merely exemplary as the method of the present invention may be implemented also when other routing protocols are used. For example, if the IS-IS link state protocol is implemented, the continuity check link state information may be inserted into the IP reachability object of the link state PDU.

Upon reception of the link state messages by the node, the continuity check link state information are preferably stored together with the link state information into the database DB.

The operation of the communication network CN will now be described with reference to a non limiting exemplary situation. In this exemplary situation, node A is required to set up a path to transmit a data traffic flow to node F. Node A receives a path set up request that typically comprises constraints on the attributes of the links and nodes that the path shall traverse. For instance, the request may contain constraints related to the Quality of Service (QoS) associated with the data traffic flow, e.g. the maximum delay that the packets may experience, and/or to the cost of the links. Another constraint may be related to the required CC packet transmission rate which shall be guaranteed for implementing a continuity checking monitoring of the path between node A and node F through an OAM protocol, such as the BFD protocol described above. An example of another OAM protocol which may be used to implement continuity check monitoring in MPLS-TP networks is the Continuity Check Message (CCM) as defined in ITU-T draft Recommendation G.8113.1.

Upon reception of the path setup request, the path computation module PCM of node A determines, in cooperation with the admission controller AC, the path for the data traffic flow. In particular, the path computation module PCM reads the database DB and acquires the link state information related to the links of the network. Further, the path computation modules PCM reads the continuity check link state information related to the CC packet transmission periods or rates and the maximum path bandwidths associated to the links. The path computation module PCM then calculates the nodes that the path shall traverse on the basis of the information stored in the database DB and in order to satisfy the constraints. For instance, the path computation module PCM may compute the path by implementing the known Constrained Shortest Path First (CSPF) algorithm which makes use of the Dijkstra algorithm to build a Dijkstra graph of the network's nodes which indicates a path to node F. Then, the path computation module PCM may prune the Dijkstra graph and eliminate all the links that do not satisfy the constraints. In this respect, the constraint related to the CC packet transmission rate shall be applied to the links originated from the end nodes (namely, nodes A and F in the exemplary situation considered here). Then, pruning shall eliminate from the Dijkstra graph all the links originated/terminated from/at the end nodes whose interfaces do not support the required CC packet transmission rate.

For instance, the path computation module PCM may compute a first path comprising nodes B, C, D for transporting the packets of the data traffic flow from node A to node F, and a second path comprising nodes B and E. Selection between the first path and the second path may be performed on the basis of the constraints. In particular, if the shortest path to F is to be computed, the second path is selected. If, however, the interface of node F to/from node E does not support the required CC packet transmission rate, the first path shall be selected, even if is longer that the first path.

Therefore, advantageously, the availability of the continuity check link state information into the database DB allows building paths that may be monitored at a given CC packet transmission rate. Indeed, as discussed above, when PRC mechanisms are used to recover from failures and protect the data traffic flow, different failure detection periods may be required for protection switching. If a short failure detection period is required, e.g. 12 ms, together with a short recovery time, e.g. 50 ms, the present invention allows building the path so as a CC packet transmission period of 3.33 ms is guaranteed. In other cases, when there is no need for short failure detection periods, the CC packet transmission period may be larger.

Moreover, advantageously, provisioning the maximum path bandwidth information associated to the CC packet transmission rate allows avoiding some drawbacks related to the fact that logical links may bundle a number of physical links together. In the exemplary situation of FIG. 2, node A and node B are connected by the logical link LL that comprises two different physical links and each node comprises a different interface per physical link. It is assumed that the first physical link PL1 has a bandwidth of 40 Gb/s and supports a CC packet transmission rate of 100 packets/s (i.e. the first interfaces I1-A, I1-B at the end nodes A, B of the first physical link PL1 are capable of emitting CC packets at the rate of 100 packets/s), while the second physical link PL2 has a bandwidth of 100 Gb/s and supports a CC packet transmission rate of 300 packets/s (i.e. the second interfaces I2-A, I2-B at the end nodes A, B of the second physical link PL2 are capable of emitting CC packets at the rate of 300 packets/s). When the link state routing protocol is executed, the single logical link LL may be advertised to all the other nodes of the communication network CN with 140 Gb/s of unreserved bandwidth and a maximum bandwidth of 100 Gb/s. This is the situation when the OSPF-TE routing protocol is implemented and TE links comprising bundles of physical links are advertised. In the case described, the maximum bandwidth for a single path traversing nodes A and B is 100 Gb/s. The continuity check link state information related to the logical link LL comprise the CC packet transmission period or rate of the physical resources interconnecting nodes A and B, i.e. the physical links PL1, PL2, and the respective maximum path bandwidth, namely 40 Gb/s associated to a CC packet transmission rate of 100 packets/s and 100 Gb/s associated to a packet transmission rate of 300 packets/second.

It is further assumed that 70% of the 100 Gb/s bandwidth of the second physical link PL2 has been allocated. In this case, the available bandwidth for a path traversing nodes A and B which may be monitored at 300 CC packets/second drops to 30 Gb/s. When the 70% of the bandwidth of physical link PL1 is allocated, a link state message is generated by node A and node B with updated link state information and continuity check link state information. In particular, the continuity check link state information comprise the CC packet transmission rate of 300 packets/second associated to a maximum path bandwidth equal to 30 Gb/s. If the information on the maximum path bandwidths associated to the CC packet transmission rates were not included in the continuity check link state information, the logical link LL would be advertised with 70 Gb/s of unreserved bandwidth, 40 Gb/s of maximum bandwidth and possible CC packet transmission rates of 100 packets/second and 300 packets/second. Then, in this case, if a 40 Gb/s path is to be setup between node A and F, and a CC packet transmission rate of 300 packets/second is required, the path computation module PCM may select to pass though the logical link LL with the 40 Gb/s path, but only the first physical link PL1 may then be used, which guarantees a maximum bandwidth of 40 Gb/s. Disadvantageously, the first physical link PL1 does not support the CC packet transmission rate of 300 packets/second. Hence, the path is set up and it passes through the first physical link PL1, but when an OAM monitoring session starts, the path can not be monitored at the required CC packet transmission rate and the path shall be tore down. According to the present invention, addition of the information related to the maximum path bandwidth associated to the CC packet transmission rates supported by the links advantageously avoids this situation. Indeed, in this case, the module PCM would not have selected the logical link LL for the 40 Gb/s path as the logical link LL, when 70% of the bandwidth of physical link PL1 is allocated, does not guarantee a maximum bandwidth of 40 Gb/s and a CC packet transmission rate of 300 packets/second.

Once the path is computed and selected by the path computation module PCM, the signaling controller SC of node A may assign a label to the path for implementing the multi-protocol label switching. In this case, node A generates a signaling message in order to advertise the label to the node neighbours, i.e. node B in this exemplary situation. Node B in its turn, upon reception of the signaling message from node A, assigns a label to the path and advertises its neighbours, namely node A, node C and node E. This way, all the nodes of the network have knowledge of the label assigned to the path. In particular, the nodes collects and stores, for each path, the information related to the inbound interface (which identifies the node from which the packets are received) and the label of the incoming packets and the information related to the outbound interface (which identifies the node to which the packets are sent) and the label of the outgoing packets.

Moreover, the nodes comprised within the path exchange signaling messages in order to reserve the needed resources. In particular, according to the RSVP-TE signaling protocol, the signaling controller SC of node A generates a path message that is transmitted to node B and then forwarded to the other intermediate nodes along the path which has been selected. As mentioned above, the path message comprises the information of the path bandwidth.

When node F receives the path message it sends a reservation message to the node A along the reverse path, which triggers each intermediate node to reserve the resources needed to set up the path. In particular, upon reception of the reservation message, each node in the path may choose the interface to be used for forwarding packets, if the node has more than one interface towards the next node within the path. The interface of the end node terminating the path is selected by the end node in case of unidirectional path. In case of a bidirectional path, the interface of the end node terminating the path may be selected by the end node or by the penultimate node.

According to the present invention, the signalling message used to reserve resources (namely, the path message when the RSVP-TE signalling protocol is used) comprises a continuity check signalling information, i.e. an information indicative of a predefined value or a predefined range of values of the CC packet transmission period or rate which is requested in order to monitor the path. In particular, according to an embodiment of the present invention, the signalling message comprises the value of the requested CC transmission period (e.g. in milliseconds) or rate (in packets/second). In this case, the penultimate node or the end node selects an interface which supports the CC packet transmission period or rate indicated in the signalling message. Alternatively, according to another embodiment of the present invention, the signalling message comprises a minimum value of the CC packet transmission period or rate and a maximum value of the CC packet transmission period or rate. In this case, a range of values of the CC packet transmission period or rate is defined. In this case, the penultimate node or the end point selects an interface which supports a CC packet transmission period or rate within the range indicated in the signalling message.

Preferably, when the RSVP-TE signaling protocol is implemented, the continuity check signalling information is inserted into the path message. In particular, this information may be inserted into a dedicated object of the path message.

Figure 6A:
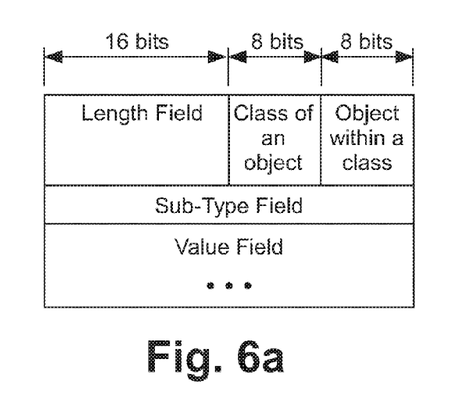
FIGS. 6a, 6b and 6c show the structure of an object comprised in the RSVP-TE path message according to an embodiment of the present invention.
Figure 6B:
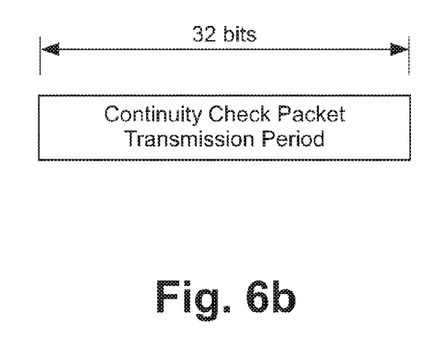
Figure 6C:
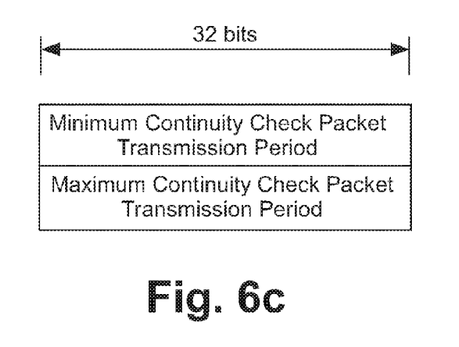

FIGS. 6a, 6b and 6c show the structure of the dedicated object of the path message according to this embodiment of the present invention. The dedicated object preferably comprises a length field L of two bytes, a C-num field Cn, a C-Type field Ct. Further, the object preferably comprised a sub-type field ST and a value field V. The length field L preferably comprises the length (in bytes) of the value field V. The C-num field Cn identifies a class of the object and the C-Type field Ct identifies the object within the class. These fields are not relevant to the present invention and will not be described in further detail. The sub-type field value ST preferably defines the format of the continuity check signalling information. The value comprised in this field may be, for instance, equal to 0 if the CC information comprise the required CC packet transmission period or rate and it may be equal to 1 if the continuity check signalling information comprise the range of the values of the CC packet transmission period or rate. The value field V preferably comprises the continuity check signalling information. In particular, it preferably comprises a first data structure or a second data structure as those illustrated in FIGS. 6b and 6c, respectively. The first data structure preferably comprises 4 bytes with the value of the required CC packet transmission period or rate. The second data structure preferably comprises a first field of 4 bytes with the minimum value of the CC packet transmission period or rate and a second field of 4 bytes with the maximum value of the CC packet transmission period or rate.

According to an alternative embodiment, the continuity check signalling information may be inserted within the adspec object of the path reservation message.

Advantageously, according to the present invention, also the signalling messages used to setup the path carry information related to the required CC packet transmission rate. This way, when resources are reserved, the penultimate node or the end node may select an interface that supports the required CC packet transmission rate.

Advantageously, according to the present invention, the set up of a path (a working path or a protection path) between two nodes in the network is non tentative since the end points support the CC packet transmission rate required for complying with the service level agreements inherent to the services provided through the established path. Moreover, the present invention allows implementing protection and restoration mechanisms in a very efficient manner as the computation of the protection path is constrained by the requirement of supporting a CC packet transmission rate that guarantees the protection switching capabilities the inherent to these mechanisms (e.g. failure detection time of 12 ms and recovery time of 50 ms).

The invention claimed is:

1. A method for exchanging information for establishing a path between a first node and a second node of a communication network, said first node and said second node being adapted to send continuity check messages to monitor said established path, said method comprising:
   a) generating, at said first node and at said second node, at least one link state message according to a link state routing protocol;
   b) inserting continuity check link state information into said at least one link state message; and
   c) exchanging, between said first node and said second node, said link state messages for computing said path;
   wherein said continuity check link state information are indicative of at least one rate of transmission of said continuity check messages supported by said first node and said second node.

2. The method according to claim 1, wherein said step b) comprises, at each of said first node and said second node, inserting into said at least one link state message one or more rates of transmission of said continuity check messages supported by respective one or more physical resources interconnecting the node to its neighbouring nodes of the communication network, and, for each of said one or more supported rates of transmission, a respective maximum bandwidth of said path that can be monitored with said continuity check messages emitted at said each of said supported rates.

3. The method according to claim 1, wherein said step b) comprises, at each of said first node and said second node, inserting into said at least one link state message one or more respective ranges of rates of transmission of said continuity check messages supported by respective one or more physical resources interconnecting the node to its neighbouring nodes of the communication network, and, for each of said one or more supported ranges, a respective maximum bandwidth of said path that can be monitored with said continuity check messages emitted at a rate within said each of said supported said supported ranges.

4. The method according to claim 1, further comprising:
   d) generating, at said first node, at least one signalling message according to a signalling protocol;
   e) inserting continuity check signalling information into said at least one signalling message; and
   f) sending from said first node to said second node said at least one signalling message for establishing said path;
   wherein said continuity check signalling information are indicative of at least one requested rate of transmission of said continuity check messages.

5. The method according to claim 4, wherein said step e) comprises inserting into said at least one signalling message one requested rate of transmission of said continuity check messages.

6. The method according to claim 4, wherein said step e) comprises inserting into said at least one signalling message a requested range of rates of transmission of said continuity check messages.

7. The method according to claim 1, wherein said link state routing protocol is an Open Shortest Path First-Traffic Engineering (OSPF-TE) routing protocol and said at least one link state message is a link state advertisement comprising a header and a payload.

8. The method according to claim 7 wherein said step b) comprises inserting said continuity check link state information within a dedicated sub-Type/Length/Value (sub-TLV) into a traffic engineering TLV comprised within said payload.

9. The method according to claim 7, wherein said step b) comprises inserting said continuity check link state information into a switching capability-specific information field of an interface switching capability descriptor sub-TLV of a traffic engineering TLV comprised within said payload.

10. The method according to claim 4, wherein said signalling protocol is a Resource Reservation Protocol-Traffic Engineering (RSVP-TE) signalling protocol.

11. The method according to claim 10, wherein said signalling message is a path message and said step e) comprises inserting said continuity check signalling information into a dedicated object of said path message.

12. A node for a communication network, said communication network comprising a further node, said node comprising a control plane module, said control plane module comprising a routing controller configured to:
   generate at least one link state message according to a link state routing protocol;
   insert continuity check link state information into said at least one link state message; and
   send said at least one link state message to said further node, for computing a path connecting said node and said further node,
   wherein said continuity check link state information are indicative of at least one rate of transmission of said continuity check messages supported by said node and said further node.

13. The node according to claim 12, further comprising a signalling controller configured to:
   generate at least one signalling message according to a signalling protocol;
   insert continuity check signalling information into said at least one signalling message; and
   send said at least one signalling message to said further node for establishing said path;

wherein said continuity check signalling information are indicative of at least one requested rate of transmission of said continuity check messages.

14. A communication network comprising a node according to claim 12.

* * * * *